United States Patent
Harayama

(10) Patent No.: US 11,312,081 B2
(45) Date of Patent: Apr. 26, 2022

(54) SHAPING SYSTEM, SHAPING METHOD, AND SHAPING CONTROL APPARATUS

(71) Applicant: MIMAKI ENGINEERING CO., LTD., Nagano (JP)

(72) Inventor: Kenji Harayama, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/702,554

(22) Filed: Dec. 4, 2019

(65) Prior Publication Data

US 2020/0180229 A1    Jun. 11, 2020

(30) Foreign Application Priority Data

Dec. 7, 2018    (JP) .............................. JP2018-229680

(51) Int. Cl.
*G05B 19/4099*    (2006.01)
*B33Y 50/02*    (2015.01)
*B29C 64/393*    (2017.01)
*B29C 64/40*    (2017.01)

(52) U.S. Cl.
CPC ............ *B29C 64/393* (2017.08); *B29C 64/40* (2017.08); *B33Y 50/02* (2014.12); *G05B 19/4099* (2013.01); *G05B 2219/49007* (2013.01)

(58) Field of Classification Search
CPC ....... B29C 64/393; B29C 64/40; B33Y 50/02; G05B 19/4099; G05B 2219/49007
See application file for complete search history.

(56) References Cited

U.S. PATENT DOCUMENTS

| 2017/0252818 | A1* | 9/2017 | Gibson | ................. B33Y 10/00 |
| 2018/0230246 | A1* | 8/2018 | Vidavsky | ............... B33Y 40/00 |
| 2018/0340089 | A1* | 11/2018 | Brunner | ................ C09D 11/102 |
| 2020/0143006 | A1* | 5/2020 | Matusik | ................ B29C 64/393 |
| 2020/0346411 | A1* | 11/2020 | Arad | ..................... B29C 64/112 |

FOREIGN PATENT DOCUMENTS

JP    2015071282    4/2015

OTHER PUBLICATIONS

Rosales S, Ferrándiz S, Reig MJ, Seguí J. Study of soluble supports generation in 3d printed part. Procedia Manufacturing. Jan. 1, 2017;13:833-9 ("Rosales") (Year: 2017).*

* cited by examiner

*Primary Examiner* — Rocio Del Mar Perez-Velez
*Assistant Examiner* — Alicia M. Choi
(74) *Attorney, Agent, or Firm* — JCIPRNET

(57) ABSTRACT

A shaping system for shaping a stereoscopic shaped object, the shaping system including a shaping device serving as a shaping portion and a control PC serving as a shaping controller. At a time of shaping a shaped object, the shaping device further forms a support layer that supports at least a part of the shaped object being shaped, and the control PC predicts a support layer removal time which is a time required for removing the support layer after formation of the shaped object and the support layer in the shaping device is completed.

10 Claims, 3 Drawing Sheets

SHAPING SYSTEM, SHAPING METHOD, AND SHAPING CONTROL APPARATUS

CROSS REFERENCE TO RELATED APPLICATIONS

This application claims the priority benefit of Japanese Patent Application No. 2018-229680, filed on Dec. 7, 2018. The entirety of the above-mentioned patent application is hereby incorporated by reference herein and made a part of this specification.

TECHNICAL FIELD

The present disclosure relates to a shaping system, a shaping method, and a shaping control apparatus.

DESCRIPTION OF THE BACKGROUND ART

Conventionally, a shaping device (3D printer) for shaping a shaped object using an inkjet head is known (see e.g., Japanese Unexamined Patent Publication No. 2015-071282 (Patent Literature 1)). In such a shaping device, for example, the shaped object is shaped through a layered shaping method by overlapping a plurality of layers of ink formed by an inkjet head.
Patent Literature 1: Japanese Unexamined Patent Publication No. 2015-071282

SUMMARY

When shaping a shaped object using a shaping device, for example, multiple layers of ink needs to be formed, and thus a great amount of time is sometimes required for shaping. However, in recent years, it is desired to perform shaping more efficiently due to the spread of applications of the shaping device. The present disclosure thus provides a shaping system, a shaping method, and a shaping control apparatus capable of overcoming such problem.

In order to efficiently shape a shaped object, it is usually desired to shorten the shaping time, which is the time required for the operation of layering the layers of ink. In this case, for example, it is conceivable to select a layout that minimizes the shaping time as a layout that specifies the orientation and the like of a shaped object during shaping.

However, the inventor of the present application has found through intensive research that even if the shaping time is shortened, the time until all the work related to shaping is completed may become longer. More specifically, for example, when shaping a shaped object in a shaping device, a support layer is formed at the periphery and the like of the shaped object as needed. In this case, a process for removing the support layer is usually required after the process of layering the layers of ink. More specifically, as a support material which is a material of the support layer, for example, a water-soluble material or the like is used. In this case, the support layer is removed by immersing the shaped object and the support layer in a support material removing liquid such as water, for example, for about one hour to several tens of hours.

Moreover, the range (how to attach the support layer) for forming the support layer at the time of shaping the shaped object varies, for example, depending on the shape, layout, and the like of the shaped object. Therefore, for example, when the layout is changed, the time required to remove the support layer (support layer removal time) also changes. In this case, for example, the support layer removal time may become longer by selecting a layout that minimizes the shaping time. As a result, the time until all the work related to shaping is completed may become longer.

On the other hand, the inventor of the present application considered, for example, predicting (estimating) the support layer removal time at the time of specifying the layout. With such a configuration, for example, a layout can be selected in consideration of the time until all the work related to shaping is completed. In addition, for example, the shaping of the shaped object can be more efficiently carried out. Furthermore, for example, when shaping a shaped object according to an order, and the like, it becomes possible to improve the accuracy of predicting the delivery date by clarifying the time required for the post-processes such as removal of the support layer, and the like.

Through further thorough researches, the inventor of the present application found features necessary for obtaining such effects and contrived the present disclosure. In order to solve the problems described above, the present disclosure provides a shaping system for shaping a stereoscopic shaped object, the shaping system including a shaping portion that performs an operation of shaping the shaped object; and a shaping controller that controls the operation of shaping the shaped object in the shaping portion; where at a time of shaping the shaped object, the shaping portion further forms a support layer that supports at least a part of the shaped object being shaped; and the shaping controller predicts a support layer removal time which is a time required for removing the support layer after formation of the shaped object and the support layer in the shaping portion is completed.

When configured in this manner, for example, the support layer removal time can be appropriately predicted. Furthermore, in this case, for example, the prediction of the support layer removal time is assumed to be performed at a time of specifying a layout which is information indicating an orientation of the shaped object being shaped and a position where a support layer is formed. With such a configuration, for example, a layout can be selected in consideration of the time until all the work related to shaping is completed. In addition, for example, the shaping of the shaped object can be more efficiently carried out.

In this configuration, the shaping controller specifies the layout, for example, to specifying the operation of shaping the shaped object in the shaping portion. Furthermore, in this case, for example, it is conceivable to predict the support layer removal time in association with the layout. With such a configuration, for example, the control of the shaping operation and the prediction of the support layer removal time can be appropriately performed.

In this configuration, the shaping controller displays, for example, the result of prediction of the support layer removal time to the user. With such a configuration, for example, the result of prediction of the support layer removal time can be appropriately notified to the user who performs the layout operation and the like. In this case, for example, the shaping controller predicts the support layer removal time in association with the specified layout. Predicting the support layer removal time in association with the layout means, for example, predicting the support layer removal time when the shaped object and the support layer are formed with the layout specified by the user.

Furthermore, in this configuration, the shaping controller predicts the support layer removal time based on a surface area of the support layer, for example. The surface area of the support layer is, for example, the surface area of the support layer formed at the time of shaping the shaped object. The surface area of the support layer can be considered as, for example, the area of a part of the support layer that is exposed to the periphery. With such a configuration, for example, the support layer removal time can be appropriately predicted. More specifically, in this configuration, the shaping portion uses, for example, a material having a property of dissolving with respect to a support material removing liquid which is a predetermined liquid as a support material to become a material of the support layer. In this case, the support layer removal time is, for example, a time required for removing the support layer when removing the support layer by immersing the shaped object and the support layer in the support material removing liquid. Furthermore, in this case, the surface area of the support layer can be considered as, for example, the area of the part that comes into contact with the support material removing liquid in a state where the shaped object and the support layer are immersed in the support material removing liquid. Moreover, as such a support material, for example, a water-soluble support material can be used. In this case, for example, water may be used as the support material removing liquid.

At the time of predicting the support layer removal time, it is preferable to further consider various conditions that affect the support layer removal time other than the surface area of the support layer. In this case, in the shaping controller, for example, it is conceivable to predict the support layer removal time based further on the thickness of the support layer in the normal direction. Furthermore, it is considered that the rate at which the support material dissolves also varies depending on the temperature of the support material removing liquid. Therefore, in the shaping controller, for example, it is preferable to predict the support layer removal time based further on the temperature of the support material removing liquid.

Furthermore, at the time of removing the support layer, the surface area of the support layer varies according to the progress of dissolution. Therefore, in order to predict the support layer removal time with higher accuracy, it is conceivable to consider not only the surface area of the support layer before the start of removal but also the surface area in the middle of removal. In this case, for example, the shaping controller predicts a surface area during dissolution which is a surface area of the support layer remaining at a time point a part of the support layer is dissolved by being immersed in the support material removing liquid, and predicts the support layer removal time based further on the surface area during dissolution. With this configuration, for example, the support layer removal time can be predicted with higher accuracy.

Furthermore, the support material removing liquid is not necessarily replaced every time the support layer with respect to one shaped object is removed, and may be repeatedly used with respect to the plurality of shaped objects and the support layers. In this case, if the amount of support material already dissolved in the support material removing liquid is increased, the dissolution rate of the support material may be decreased. Therefore, in order to predict the support layer removal time with higher accuracy, for example, it may be considered to further consider how much support material has already dissolved in the support material removing liquid to be used. More specifically, when using the support material removing liquid having a history of being used to remove the support layer formed at the time of shaping another shaped object, for example, the shaping controller predicts the support layer removal time based further on an amount of support material dissolved in the support material removing liquid. With this configuration, for example, the support layer removal time can be predicted with higher accuracy.

In addition, the prediction of the support layer removal time may be performed, for example, by referring to the result of the removal of the support layer performed in the past. In this case, for example, the shaping controller predicts the support layer removal time based on, for example, actual removal data which is data associating a time required when the support layer was actually removed in the past and a layout indicating the support layer. With this configuration, for example, the support layer removal time can be predicted with higher accuracy based on past results. Furthermore, in this case, for example, it is conceivable to enhance the accuracy of prediction by accumulating pas results. More specifically, in this case, the shaping controller may manage the actual removal data to sequentially accumulate new actual removal data. In this case, for example, the shaping controller predicts the support layer removal time based on the accumulated actual removal data. According to such a configuration, for example, the accuracy of prediction of the support layer removal time can be appropriately enhanced. Furthermore, in this case, for example, it is considered to predict the support layer removal time using an artificial intelligence (AI) technology or the like.

Furthermore, the prediction result of the support layer removal time is not simply displayed, and may be used to assist the user in selecting a layout. In this case, as a method for assisting the user in selecting a layout, for example, consideration is made to present a layout candidate or present a layout change policy. More specifically, in this case, for example, the shaping controller may search for a layout with a shorter support layer removal time, and display the result of the search to the user. In addition, in the shaping controller, it is conceivable to predict the shaping time in addition to the support layer removal time. In this case, shaping time is, for example, a time required to form the shaped object and the support layer in the shaping portion. In this case, for example, the shaping controller may search for a layout in which the total time of the shaping time and the support layer removal time is shorter, and display the result of the search to the user. According to such a configuration, for example, a user can select a more preferable layout.

Furthermore, in this case, the search for the layout can be considered as, for example, searching for a new layout, a guideline for changing the layout, or the like. Therefore, as the search result, for example, it is conceivable to present to the user a layout in which the support layer removal time or the like (e.g., the support layer removal time or the total time of the shaping time and the support layer removal time) is shorter than the layout specified by the user, present to the user a guideline for changing the layout for shortening the support layer removal time or the like.

Furthermore, for example, the support layer removal time and the like corresponding to the layout specified by the user may be predicted and the search of the layout may be performed based on the result. According to such a configuration, for example, the result of the search of a layout can be presented with higher accuracy. In addition, the layout search may be performed based on, for example, a pattern prepared in advance, instead of actually predicting the support layer removal time or the like for all layouts. In this case, for example, data associating a typical layout pattern with the magnitude relationship of the support layer removal time may be prepared in advance, and a layout pattern that can shorten the support layer removal time may be presented based on the data. According to such a configuration, for example, the result of the search of a layout can be presented more simply and appropriately.

Use of a shaping method, a shaping control apparatus and the like having the features similar to above can be considered for the configuration of the present disclosure. In this case as well, for example, effects similar to the above can be obtained. Furthermore, in this case, the shaping method can be considered as, for example, a manufacturing method for a shaped object. Furthermore, as a configuration of the present disclosure, for example, a program executed in the shaping control apparatus can be considered.

According to the present disclosure, for example, shaping of a shaped object can be more efficiently performed.

BRIEF DESCRIPTION OF THE DRAWINGS

FIG. 1A shows an example of a configuration of the shaping system 10. FIG. 1B shows an example of a configuration of a main part of a shaping device 12. FIG. 1C shows an example of a configuration of a head portion 102.

FIG. 2A shows an example of how the support layer 52 is attached to the shaped object 50 having various shapes. FIG. 2B shows an example of a state in which the support layer 52 is gradually removed in shaped objects A, B, and C.

FIG. 3 is a view showing an example of the relationship between layout and support layer removal time and the like.

DETAILED DESCRIPTION OF EMBODIMENTS

Figure 1A:
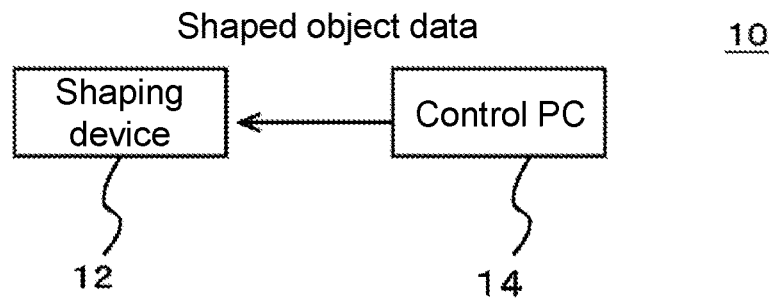
FIGS. 1A to 1C are views showing an example of a shaping system 10 according to an embodiment of the present disclosure.
Figure 1B:
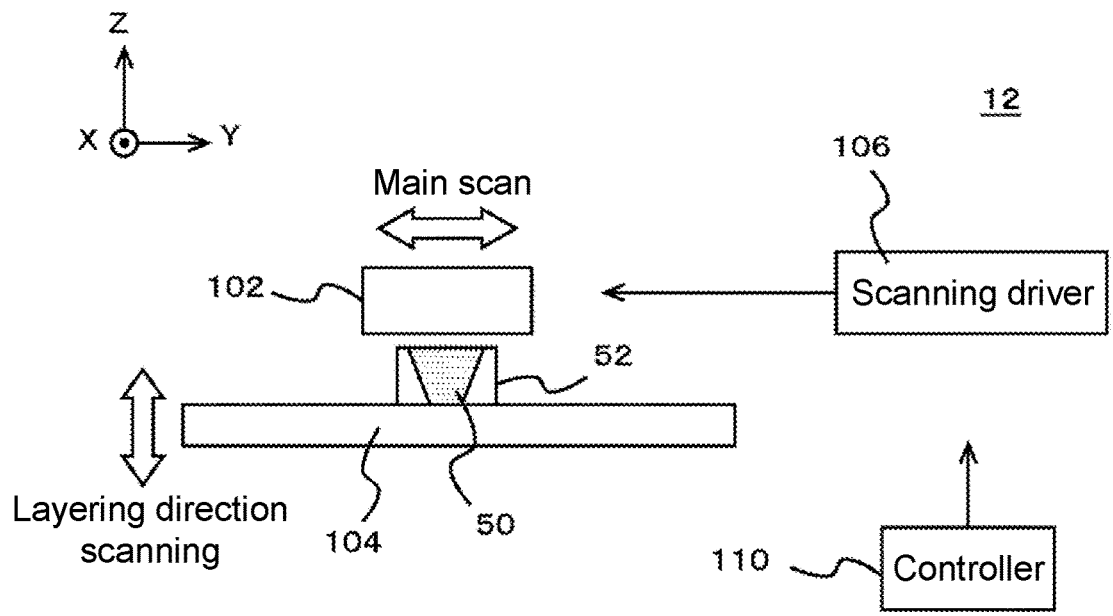
Figure 1C:
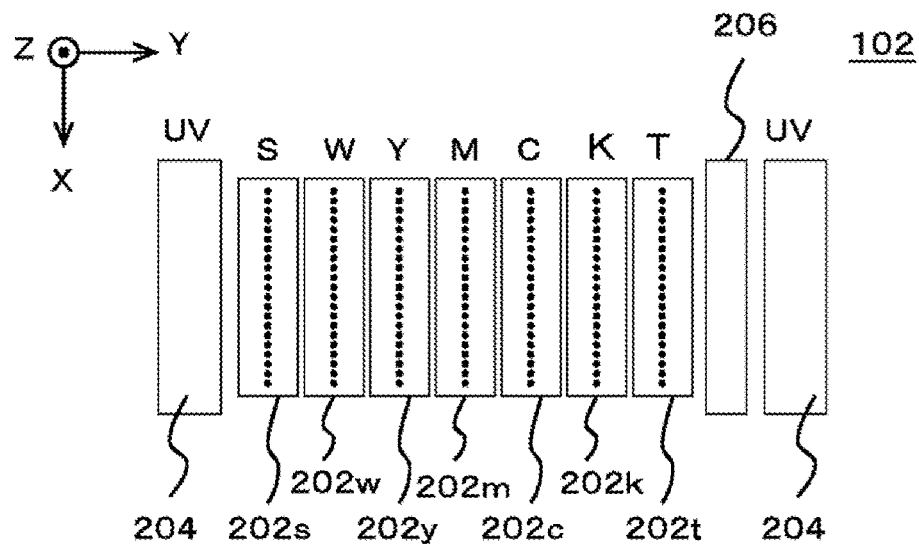

Hereinafter, an embodiment according to the present disclosure will be described with reference to the drawings. FIGS. 1A to 1C show an example of a shaping system 10 according to an embodiment of the present disclosure. FIG. 1A shows an example of a configuration of the shaping system 10. In the present example, the shaping system 10 is a shaping system that shapes a stereoscopic shaped object, and includes a shaping device 12 and a control PC 14.

The shaping device 12 is an example of a shaping portion that performs an operation of shaping a shaped object. In the present example, the shaping device 12 is a full-color shaping device capable of shaping a shaped object colored in full color, and receives shaped object data, which is data indicating a shaped object to be shaped, from the control PC 14, and shapes the shaped object based on the shaped object data. Furthermore, the shaping device 12 shapes a shaped object in accordance with the control of the control PC 14. Moreover, at the time of shaping a shaped object, the shaping device 12 forms a support layer around the shaped object and the like as necessary. The support layer is, for example, a layered structural object that supports at least a part of the shaped object being shaped. The support layer is formed as necessary at the time of shaping the shaped object and removed after the shaping is completed.

The control PC 14 is an example of a shaping controller that controls the operation of shaping a shaped object in the shaping device 12. In the present example, the control PC 14 is a computer (host PC) that controls the operation of the shaping device 12 by executing a predetermined program, and provides shaped object data to the shaping device 12 to control the shaping operation of the shaping device 12. In this case, the control PC 14 provides, for example, shaped object data indicating a shaped object in which at least a part is colored to the shaping device 12.

Furthermore, in the present example, the control PC 14 provides the shaping device 12 with data specifying at least the layout of the shaped object to be formed by the shaping device and the support layer as shaped object data. This layout can be considered as, for example, the information and the like which show the orientation of the shaped object being shaped, and the position where the support layer is to be formed. In this case, the operation of the control PC 14 can be considered as, for example, specifying the operation of shaping the shaped object by specifying a layout. Furthermore, as such shaped object data, data same as or similar to the known shaped object data including layout information can be used. In addition to the layout, it is conceivable to use data including various types of information necessary for forming a shaped object 50 and a support layer 52 as the shaped object data.

In the present example, the control PC 14 further predicts a support layer removal time in association with the layout. The support layer removal time is, for example, the time required for removing the support layer after the formation of the shaped object and the support layer in the shaping device 12 is completed. The operation for predicting the support layer removal time can be considered as, for example, an operation of a support removal time calculation process for estimating the time required for removing the support layer. The operation for predicting the support layer removal time, how to use the predicted support layer removal time, and the like will be described in more detail later.

As described above, in the present example, the shaping system 10 is configured by a plurality of devices, the shaping device 12 and the control PC 14. However, in a modified example of the shaping system 10, the shaping system 10 may be configured by a single device. In this case, for example, it is conceivable to configure the shaping system 10 with a single shaping device 12 also having the function of the control PC 14. Furthermore, for example, the shaping system 10 may be configured by three or more devices. In this case, some functions of the shaping device 12 or the control PC 14 may be executed by another device.

Next, a specific configuration of the shaping device 12 will be described. FIG. 1B shows an example of a configuration of a main part of a shaping device 12. In the present example, the shaping device 12 is a shaping device for shaping a stereoscopic shaped object 50, and includes a head portion 102, a shaping table 104, a scanning driver 106, and a controller 110.

Other than the points described below, the shaping device 12 may have a configuration same as or similar to a known shaping device. More specifically, other than the points described below, the shaping device 12 may have features same as or similar to a known shaping device that carries out shaping by ejecting a droplet to become the material of the shaped object 50 using an inkjet head. Furthermore, other than the illustrated configuration, the shaping device 12 may further include, for example, various types of configurations necessary for the shaping, and the like of the shaped object 50. Moreover, in the present example, the shaping device 12 is a shaping device (3D printer) that shapes a stereoscopic shaped object 50 through the layered shaping method. In this case, the layered shaping method is, for example, a method of shaping the shaped object 50 by overlapping a plurality of layers. The shaped object 50 is, for example, a stereoscopic three-dimensional structural object.

The head portion 102 is a part that ejects the material of the shaped object 50 (material for shaped object). In the present example, ink is used as the material of the shaped object 50. In this case, the ink is, for example, a functional liquid. Furthermore, in the present example, for example, liquid, and the like ejected from the inkjet head can also be considered as the ink. More specifically, the head portion 102 ejects ink that cures according to predetermined conditions from a plurality of inkjet heads as the material of the shaped object 50. Then, by curing the ink after landing, the respective layers forming the shaped object 50 are formed in an overlapping manner, and a shaped object is shaped through the layered shaping method. In the present example, an ultraviolet curable ink (UV ink) that cures from a liquid state by being irradiated with an ultraviolet light is used as the ink.

Furthermore, the head portion 102 further ejects ink used as a support material, which is a material of the support layer 52, in addition to the ink used as a material of the shaped object 50. The head portion 102 thereby forms the support layer 52 at a periphery of the shaped object 50, and the like as necessary. In this case, the head portion 102 forms the shaped object 50 and the support layer 52 with the layout specified by the control PC 14.

The shaping table 104 is a table-shaped member that supports the shaped object 50 being shaped, and is disposed at a position facing the inkjet head in the head portion 102, and mounts the shaped object 50 being shaped and the support layer 52 on the upper surface thereof. Furthermore, in the present example, the shaping table 104 has a configuration in which at least the upper surface is movable in a layering direction (Z direction in the drawing), and moves at least the upper surface in accordance with the progress in the shaping of the shaped object 50 by being driven by the scanning driver 106. In this case, the layering direction is, for example, a direction in which the shaping material is layered in the layered shaping method. More specifically, in the present example, the layering direction is a direction orthogonal to the main scanning direction (Y direction in the figure) and the sub scanning direction (X direction in the figure) preset in the shaping device 12.

The scanning driver 106 is a driver that causes the head portion 102 to perform a scanning operation of relatively moving with respect to the shaped object 50 being shaped. In this case, "relatively moving with respect to the shaped object 50 being shaped" means, for example, relatively moving with respect to the shaping table 104. To cause the head portion 102 to perform the scanning operation means, for example, to cause the inkjet head of the head portion 102 to perform the scanning operation. Furthermore, in the present example, the scanning driver 106 causes the head portion 102 to perform the main scan (Y scanning), the sub scan (X scanning), and the layering direction scanning (Z scanning) as the scanning operation.

The main scan is, for example, an operation of ejecting ink while relatively moving in the main scanning direction with respect to the shaped object 50 being shaped. The sub scan is, for example, an operation of relatively moving with respect to the shaped object 50 being shaped in the sub scanning direction orthogonal to the main scanning direction. Furthermore, the sub scan can be considered as, for example, an operation of relatively moving with respect to the shaping table 104 in the sub scanning direction by a preset feed amount, or the like. Moreover, the layering direction scanning is, for example, an operation of relatively moving the head portion 102 in the layering direction with respect to the shaped object 50 being shaped. The scanning driver 106 adjusts the relative position of the inkjet head with respect to the shaped object 50 being shaped in the layering direction by causing the head portion 102 to perform the layering direction scanning in accordance with the progress of the shaping operation.

The controller 110 is, for example, a CPU of the shaping device 12, and controls each part of the shaping device 12 to cause each part to execute an operation of forming the shaped object 50 and the support layer 52 in the shaping device 12. More specifically, in the present example, the controller 110 generates slice data based on the shaped object data received from the control PC 14. In this case, the slice data is, for example, data indicating a cross section of the shaped object 50 and the support layer 52 which orientation, position, and the like are specified by the layout data. Furthermore, the controller 110 generates a plurality of slice data corresponding to a plurality of positions in the layering direction set at preset intervals. In the operation of forming the respective layers of ink forming the shaped object 50, for example, each inkjet head is caused to eject ink used to form the shaped object 50 and the support layer 52 by controlling the operation of each inkjet head in the head portion 102 according to the slice data corresponding to the position of the layer of ink.

Next, a configuration of the head portion 102 in the shaping device 12 will be described in more detail. FIG. 1C shows an example of a configuration of a head portion 102. In the present example, the head portion 102 includes a plurality of inkjet heads, a plurality of ultraviolet light sources 204, and a flattening roller 206. As shown in the drawing, the plurality of inkjet heads include an inkjet head 202s, an inkjet head 202w, an inkjet head 202y, an inkjet head 202m, an inkjet head 202c, an inkjet head 202k, and an inkjet head 202t. The plurality of inkjet heads are, for example, arranged side by side in the main scanning direction with their positions in the sub scanning direction aligned. Furthermore, each inkjet head includes a nozzle row, in which a plurality of nozzles are lined in a predetermined nozzle row direction, on a surface facing the shaping table 104. Furthermore, in the present example, the nozzle row direction is a direction parallel to the sub scanning direction.

Among these inkjet heads, the inkjet head 202s is an inkjet head that ejects ink used as the support material. For example, a known material for the support layer can be suitably used for the support material. The inkjet head 202w is an inkjet head that ejects white (W color) ink. The white ink is an example of a light reflective ink, and is used, for example, when forming a light reflecting region, which is a region having a property of reflecting light in the shaped object 50. For example, the light reflecting region reflects light entering from the outside of the shaped object 50 when performing coloring with full color representation on the surface of the shaped object 50.

In the present example, for example, an inner region which is a region configuring the inside of the shaped object 50 is formed with a white ink so that the inner region functions as a light reflecting region. Furthermore, for example, the inner region may be formed as a region separate from the light reflecting region. In this case, it is conceivable to form the inner region using ink other than white ink.

The inkjet head 202y, the inkjet head 202m, the inkjet head 202c, and the inkjet head 202k are inkjet heads for coloring used at the time of shaping the colored shaped object 50. More specifically, the inkjet head 202y ejects ink of yellow color (Y color). The inkjet head 202m ejects ink of magenta color (M color). The inkjet head 202c ejects ink of cyan color (C color). Furthermore, the inkjet head 202k ejects ink of black color (K color). In addition, in the present example, each color of YMCK is an example of process colors used for full color representation by subtractive color mixing method. The inkjet head 202t is an inkjet head that ejects a clear ink. The clear ink is, for example, a clear ink that is colorless and transparent (T) with respect to visible light.

The plurality of ultraviolet light sources 204 are light sources (UV light sources) for curing ink, and generate an ultraviolet light that cures the ultraviolet curable ink. Moreover, in the present example, each of the plurality of ultraviolet light sources 204 is arranged on one end side and the other end side in the main scanning direction in the head portion 102 to sandwich the plurality of inkjet heads in between. For example, UVLED (ultraviolet LED) and the like can be suitably used for the ultraviolet light source 204. Furthermore, it is also conceivable to use a metal halide lamp, a mercury lamp, and the like for the ultraviolet light source 204. The flattening roller 206 is a flattening device for flattening the layer of ink formed during the shaping of the shaped object 50. The flattening roller 206, for example, flattens the layer of ink by making contact with a surface of the layer of ink and removing part of the ink before being cured at the time of the main scan.

The layer of ink forming the shaped object 50 can be appropriately formed by using the head portion 102 having the configuration described above. Furthermore, the shaped object 50 can be appropriately shaped by forming a plurality of layers of ink in an overlapping manner.

The specific configuration of the head portion 102 is not limited to the configuration described above and can be variously modified. For example, the head portion 102 may further include an inkjet head for colors other than the above as an inkjet head for coloring. Furthermore, the arrangement of a plurality of inkjet heads in the head portion 102 can be variously modified. For example, the positions in the sub scanning direction of some inkjet heads may be shifted from the other inkjet heads.

Next, features of the support material used in the present example, matters related to the removal of the support layer 52, and the like will be described in more detail. As described above, for example, a known material for the support layer can be suitably used as the support material. More specifically, in the present example, a water-soluble support material is used as the support material. In this case, the water-soluble support material is an example of a material having a property of being dissolved in a support material removing liquid which is a predetermined liquid. Water is an example of a support removing liquid.

In the present example, the support layer 52 is removed by immersing the shaped object 50 and the support layer 52 in water which is a support material removing liquid. Immersing the shaped object 50 and the support layer 52 in water means, for example, immersing the shaped object 50 attached with the support layer 52 (before removal of the support layer 52) in water in the removal tank in a state in which water is stored in the removal tank which is a container used at the time of removing the support layer 52. In this case, the control PC 14 predicts the time required for removing the support layer 52 in such a manner as the support layer removal time. Furthermore, when the support layer 52 is removed in this way, the time required for removing the support layer 52 varies depending on how the support layer 52 is attached to the shaped object 50. Therefore, in the present example, the control PC 14 predicts the support layer removal time based on how the support layer 52 is attached.

Figure 2A:
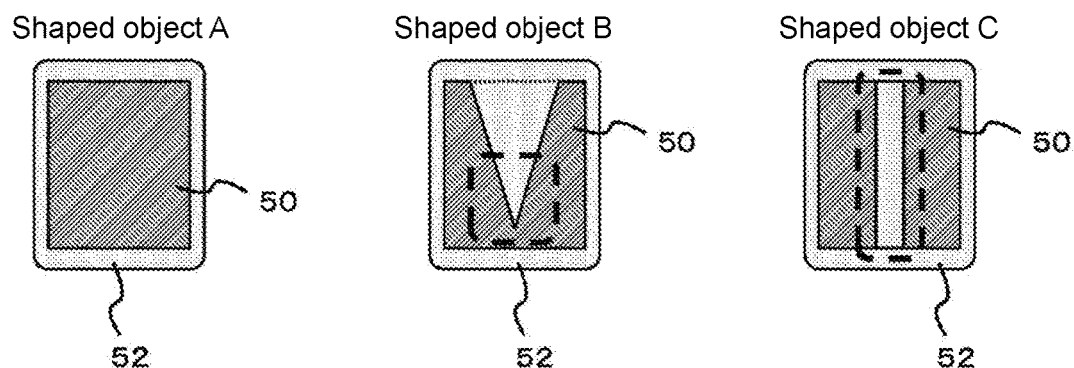
FIGS. 2A and 2B are views describing a relationship between how a support layer 52 is attached and a support layer removal time.
Figure 2B:
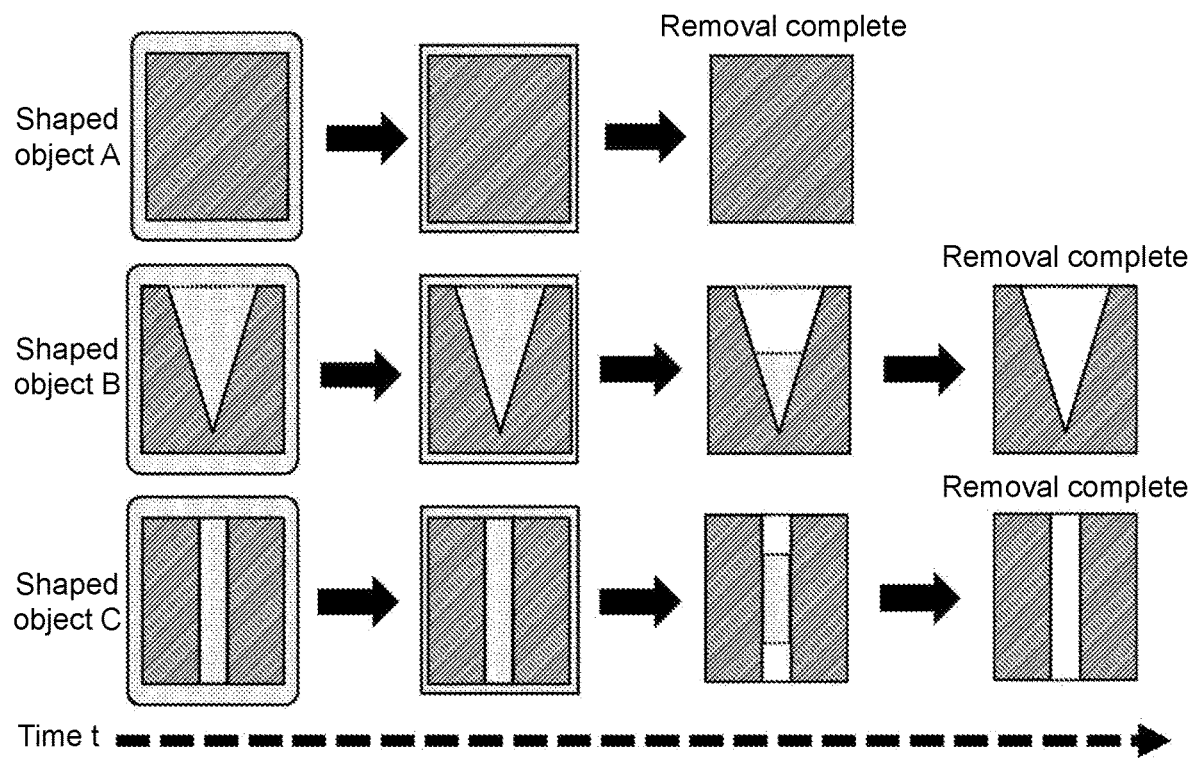

FIGS. 2A and 2B are views describing the relationship between how the support layer 52 is attached and the support layer removal time. FIG. 2A is a view showing an example of how the support layer 52 is attached to the shaped object 50 of various shapes, and shows the cross section of the shaped object 50 and the support layer 52 for an example of a configuration of the support layer 52 formed at the time of shaping the shaped object 50 of three shapes indicated as the shaped objects A, B, and C in the figure. FIG. 2B shows an example of a state in which the support layer 52 is gradually removed in shaped objects A, B, and C.

More specifically, the shaped object A is a rectangular parallelepiped shaped object 50. At the time of shaping the shaped object A, for example, the support layer 52 is formed so as to surround the shaped object 50 as shown in the figure. The shaped object B is a shaped object 50 in which a tapered hole is provided on a part of the surface of the shaped object A. As can be seen from the figure, this tapered hole is a hole that becomes narrower from the opening toward the back of the hole. At the time of shaping the shaped object B, for example, the support layer 52 is formed not only in the region surrounding the periphery of the shaped object 50 but also in the hole, as shown in the figure. The shaped object C is a shaped object 50 provided with a through-hole penetrating from one surface to the opposite surface of the shaped object A. At the time of shaping the shaped object C, for example, the support layer 52 is formed not only in the region surrounding the periphery of the shaped object 50 but also in the hole, as shown in the figure.

Here, when the support layer 52 is removed by immersing the shaped object 50 and the support layer 52 in the support material removing liquid such as water, it is conceivable that the support layer removal time becomes shorter the larger the area in which the support material removing liquid and the support layer 52 are in contact with each other. More specifically, for example, it is conceivable that the amount of support material dissolved in the support material removing liquid at a certain time is generally inversely proportional to the area in which the support material removing liquid and the support material are in contact.

In this case, in a case where the shaped object 50 is formed with a hole such as the shaped objects B and C, for example, the removal of the support material becomes difficult to proceed (difficult to remove) as the area (surface area) making contact with the water becomes smaller at the portion surrounded by a broken line in FIG. 2A, and the support layer removal time becomes longer. More specifically, in this case, for example, as shown in FIG. 2B, at the timing the support material at the periphery of the shaped object 50 is removed and the removal of the support layer 52 is completed in the shaped object A, the shaped objects B and C are in a state in which the support material is remaining in the hole. Furthermore, in the portion where the support layer 52 is remaining, the area in which the support layer 52 comes into contact with water is small with respect to the amount of support material. In this case, it can be considered that the time required for removing the remaining support material becomes longer. As a result, in the shaped objects B and C, the support layer removal time is longer than that of the shaped object A.

Therefore, the support layer removal time varies according to the shape of the support layer 52 attached to the shaped object 50, the location where the support layer 52 comes into contact with water, and the like. Therefore, in the present example, the control PC 14 (see FIGS. 1A to 1C) calculates the support layer removal time based on, for example, the shape of the support layer 52 and the location where the support layer 52 comes into contact with water. In this case, the control PC 14 uses, for example, the surface area of the support layer 52 as a parameter indicating the location where the support layer 52 comes into contact with water. Furthermore, the control PC 14 thus predicts the support layer removal time based on, for example, the surface area of the support layer 52 formed at the time of shaping the shaped object 50. In this case, the surface area of the support layer 52 is, for example, the area of the part of the support layer 52 that is exposed to the periphery. Moreover, the part of the support layer 52 that is exposed to the periphery is, for example, a part that comes into contact with water when the support layer 52 is immersed in water with the shaped object 50. With such a configuration, for example, the support layer removal time can be appropriately predicted.

Furthermore, as can be understood from the state at the time of removal of the support layer 52 shown in FIG. 2B, the surface area of the support layer 52 varies according to the progress of dissolution of the support layer 52 at the time of removing the support layer 52. Therefore, in the present example, not only the surface area of the support layer 52 before the start of the removal of the support layer 52 but also the surface area in the middle of the removal is further considered. More specifically, in this case, for example, the control PC 14 predicts the surface area during dissolution, which is the surface area of the support layer 52 remaining at the time point a part of the support layer 52 is dissolved by being immersed in water. Then, the support layer removal time is predicted based further on the surface area during dissolution. With this configuration, for example, the support layer removal time can be predicted with higher accuracy.

Moreover, in this case, for example, the surface area during dissolution is preferably predicted for a plurality of timings until the removal of the support layer 52 is completed. In this case, for example, it may be possible to set a plurality of timings at regular intervals. Moreover, it is conceivable to set the timing to predict the surface area during dissolution based on, for example, the shape of the shaped object 50 or the support layer 52.

Furthermore, as described above, in the present example, the support layer removal time is predicted in consideration of the shape of the support layer 52 and the like. Moreover, regarding this point, for example, even when a shaped object 50 having the same shape is shaped, the shape of the support layer 52 also varies depending on the layout specified at the time of shaping. As a result, the support layer removal time also varies depending on the specified layout. Therefore, in the present example, the control PC 14 sets the shape of the support layer 52 based on the layout, and predicts the support layer removal time based on the set shape of the support layer 52. In this case, for example, a preferred layout may be selected by predicting the support layer removal time in association with the layout.

Figure 3:
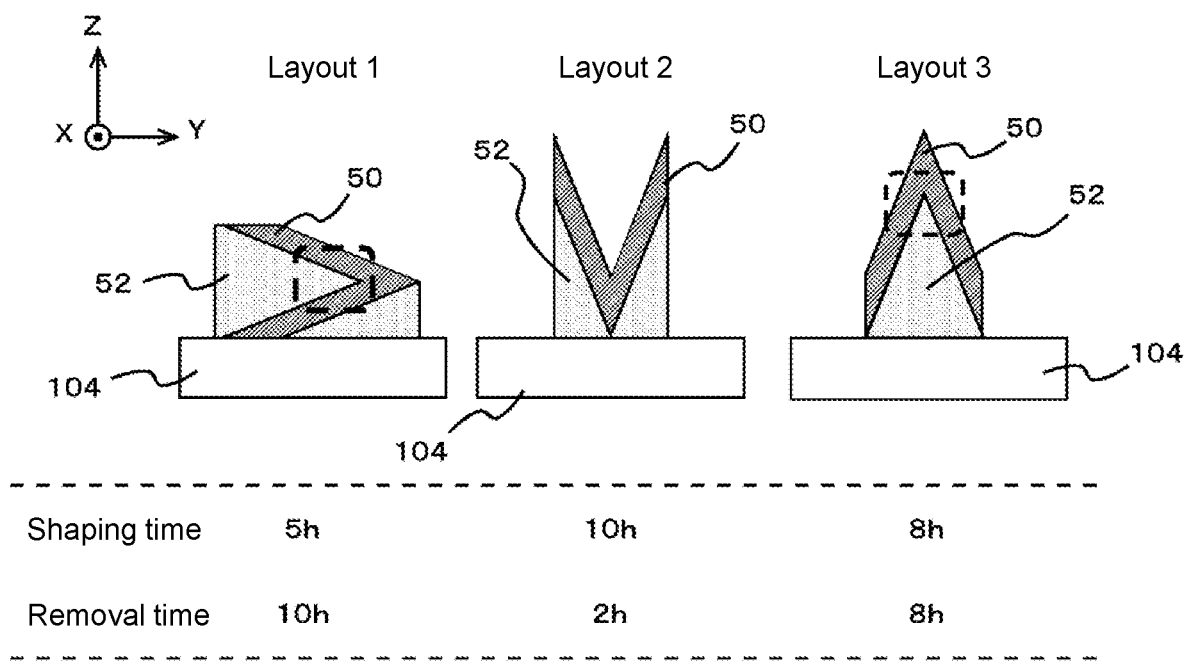

FIG. 3 is a view showing an example of the relationship between the layout and the support layer removal time, and the like, and shows an example of the shaping time and the support layer removal time (removal time) for each layout regarding a case where the shaping of the shaped object 50 having the same shape is performed in the three layouts shown as layouts 1 to 3 in the figure. In this case, the shaping time is, for example, the time required to form the shaped object 50 and the support layer 52 in the shaping device 12 (see FIGS. 1A to 1C) in the shaping system 10. In this regard, when shaping is performed by the layered shaping method, the shaping time usually becomes longer as the number of layers of ink to be layered increases. In addition, the time required to form one layer of ink becomes longer, for example, as the number of main scans performed to form the relevant layer increases. Therefore, for example, the time required to form a wider range of a layer of ink becomes longer.

In this case, in layouts 1 to 3 shown in the figure, the shaping time of layout 1 in which the width (height) in the layering direction (Z direction) is the smallest is shorter than the shaping time in layouts 2 and 3. When layout 2 and layout 3 are compared, the shaping time in layout 3 is shorter than the shaping time in layout 2 due to the difference in the range in which each layer of ink is formed. More specifically, as shown in the figure, the shaping time in layout 1 is five hours, the shaping time in layout 2 is ten hours, and the shaping time in layout 3 is eight hours.

On the other hand, as described above, the support layer removal time is determined according to the area in which the support layer 52 comes into contact with water at the time of removing the support layer 52. In this case, in layout 1 and layout 3, there are parts where the removal of the support material is difficult to proceed, such as a part surrounded by a broken line in the figure. On the other hand, in the case of layout 2, it is not necessary to form the support layer 52 in the hole-shaped part of the shaped object 50, and thus a part where the removal of the support material is difficult to proceed can be avoided from being formed. As a result, among layouts 1 to 3, the support layer removal time in layout 2 is the shortest. More specifically, the support layer removal time in layout 1 is ten hours, the support layer removal time in layout 2 is two hours, and the support layer removal time in layout 3 is eight hours.

Here, when selecting a layout at the time of shaping the shaped object 50, for example, it is conceivable to select the layout from the viewpoint of minimizing the time for using the shaping device 12 to form the shaped object 50. In this case, the layout is usually selected so as to minimize the shaping time.

However, as can be understood from the comparison of layouts 1 to 3 shown in FIG. 3, when a layout is selected by merely considering shortening the shaping time, the support layer removal time becomes longer, and thus the time until all the work related to shaping is completed may become longer. Therefore, it is sometimes preferable to select a layout so that the total of the shaping time and the support layer removal time is minimized by taking into consideration the support layer removal time in addition to the shaping time depending on the required conditions (for example, delivery date) at the time of shaping the shaped object 50. In such a case, it is preferable to select layout 2 among layouts 1 to 3.

In this regard, according to the present example, as described above, the support layer removal time can be predicted in the control PC 14, for example, at the time of specifying the layout. Furthermore, for example, a layout can be selected in consideration of the time until all time until all the work related to shaping is completed. Therefore, according to the present example, for example, the layout can be optimized in consideration of the support layer removal time. Furthermore, for example, the shaping of the shaped object 50 can be more efficiently carried out.

Next, operations performed using the support layer removal time, and the like will be described in more detail. As described above, in the present example, the control PC 14 predicts the support layer removal time in association with the layout. In this case, predicting the support layer removal time in association with the layout means, for example, predicting the support layer removal time when the shaped object 50 and the support layer 52 are formed with the layout specified by the user. Then, the control PC 14 notifies the user of the result of prediction of the support layer removal time by displaying it on a display device such as a monitor. With such a configuration, for example, the result of prediction of the support layer removal time can be appropriately notified to the user who performs the layout operation and the like.

Furthermore, the prediction result of the support layer removal time is not simply displayed, and may be used to assist the user in selecting a layout. In this case, as a method for assisting the user in selecting a layout, for example, consideration is made to present a layout candidate or present a layout change policy. More specifically, in this case, for example, it is conceivable to display a plurality of layouts for shaping the shaped object 50 having the same shape in association with the prediction results of the shaping time and the support layer removal time in each layout, and the like.

As layout candidates, for example, a layout that meets the conditions specified by the user may be selected and displayed. In this case, for example, based on the conditions specified by the user, the control PC 14 may search for a layout with a shorter support layer removal time, and display the search result to the user. Searching for a layout means, for example, searching for a layout that meets a condition from among a plurality of layouts that can be used to shape a shaped object 50 having the same shape. In addition, in the control PC 14, it is conceivable to predict the shaping time in addition to support layer removal time. In this case, for example, the control PC 14 may search for a layout in which the total time of the shaping time and the support layer removal time is shorter, and display the search result to the user. According to such a configuration, for example, a user can select a more preferable layout.

Here, in the operation described above, the layout search can be considered as, for example, search for a new layout, a guideline for changing the layout, and the like. Therefore, as the search result, for example, it is conceivable to present to the user a layout in which the support layer removal time or the like (e.g., the support layer removal time or the total time of the shaping time and the support layer removal time) is shorter than the layout specified by the user, present to the user a guideline for changing the layout for shortening the support layer removal time or the like. In this case, as a layout to be presented to the user, for example, it is conceivable to use a result of automatic layout under a condition that the support layer removal time is shortened, and the like. Furthermore, as a guideline for changing the layout, for example, it is conceivable to propose the orientation of the shaped object 50. Moreover, as a guideline for changing the layout, for example, notification of the possibility that a layout that can further shorten the support layer removal time or the like exists may be considered.

It is conceivable that the layout search as described above is performed by, for example, after receiving a specification of any one of the layouts from the user, predicting a support layer removal time corresponding to the relevant layout, and being carried out based on the prediction result. According to such a configuration, for example, the result of the search of a layout can be presented with higher accuracy. Furthermore, as a result of the search, for example, when a layout different from the layout specified by the user is presented, the support layer removal time corresponding to the layout is further calculated, and the support layer removal time or the like may be presented in association with the layout.

In addition, the layout search may be performed based on, for example, a pattern prepared in advance, instead of actually predicting the support layer removal time or the like for all layouts. In this case, for example, data associating a typical layout pattern with the magnitude relationship of the support layer removal time may be prepared in advance, and a layout pattern that can shorten the support layer removal time may be presented based on the data. According to such a configuration, for example, the result of the search of a layout can be presented more simply and appropriately. For example, consideration can be made to perform the layout search before the layout is specified by the user. In this case, for example, it is conceivable to automatically create a layout candidate that shortens the support layer removal time and the like based on the shape of the shaped object 50 to be shaped. In this case, for example, it is conceivable to automatically create a plurality of layout candidates (e.g., a layout with the shortest shaping time, a layout with the shortest support layer removal time, and a layout with the shortest total of the shaping time and the support layer removal time), and present the same to the user.

The predicted support layer removal time may be used for purposes other than those described above. More specifically, for example, when removing the support layer 52, the support layer 52 may be removed over time by leaving the support layer 52 and the shaped object 50 in water for a long time. However, in this case, if the shaped object 50 is continuously immersed in water for a long time even after the support layer 52 is removed, the quality of the shaped object 50 may be affected. In this case, for example, it is conceivable that the shaped object 50 may absorb water and soften, the color of the surface of the shaped object 50 may change, and the like. On the other hand, when predicting the support layer removal time, such problems can be appropriately prevented from occurring by managing the time for immersing the shaped object 50 and the support layer 52 in water based on the prediction result. In this case, for example, it is also considered to set the time for immersing the shaped object 50 and the support layer 52 in water based on the prediction result of the support layer removal time, and to automatically remove the shaped object 50 from the water.

Next, a method for predicting the support layer removal time will be described in more detail. As described above, in the present example, the control PC 14 predicts the support layer removal time based on the surface area of the support layer 52 and the like specified in the layout at the time of shaping. However, at the time of predicting the support layer removal time, it is preferable to further consider various conditions that affect the support layer removal time other than the surface area of the support layer 52 and the like. In this case, for example, it is conceivable to predict the support layer removal time based further on the thickness of the support layer 52 in the normal direction. Furthermore, it is considered that the rate at which the support material forming the support layer 52 dissolves also varies depending on the temperature of the water used as the support material removing liquid. Therefore, in the control PC 14, for example, it is preferable to predict the support layer removal time based further on the temperature of the water in which the shaped object 50 and the support layer 52 are immersed. According to such a configuration, for example, even when the time required for removing the support layer 52 varies depending on the environment, the support layer removal time can be predicted more appropriately according to the environment.

Furthermore, the water used for removing the support layer 52 is not necessarily replaced every time the support layer 52 with respect to one shaped object 50 is removed, and may be repeatedly used with respect to the plurality of shaped objects 50 and the support layers 52. In this case, if the amount of support material already dissolved in water is increased, the dissolution rate of the support material may be decreased. Therefore, in order to predict the support layer removal time with higher accuracy, for example, it is preferable to further consider how much support material has already dissolved in the water used for removing the support layer 52. More specifically, for example, when removing the support layer 52 using water with a history of being used to remove the support layer 52 formed at the time of shaping of another shaped object 50, the control PC 14 preferably predicts the support layer removal time based further on the amount of support material dissolved in water. With this configuration, for example, the support layer removal time can be predicted with higher accuracy.

As for the removal of the support layer 52, for example, it is conceivable to simultaneously remove the support layer 52 with respect to a plurality of shaped objects 50. The simultaneous removal of the support layers 52 with respect to the plurality of shaped objects 50 means, for example, immersing the plurality of shaped objects 50 and the support layers 52 in water stored in one removal tank and simultaneously removing the support layers 52. In this case, the dissolution rate of the support material forming the support layer 52 of each shaped object 50 may be affected by the amount of support material dissolved from the support layer 52 of another shaped object 50. Therefore, when the removal of the support layers 52 with respect to the plurality of shaped objects 50 are simultaneously carried out, it is conceivable to predict the support layer removal times for the support layers 52 of the respective shaped objects 50 based further on the shape of the support layers 52 of the other shaped objects 50, and the like. With this configuration, for example, the support layer removal time can be predicted with higher accuracy.

Furthermore, the prediction of the support layer removal time can be calculated by theoretical calculation based on the surface area of the support layer 52 and the like as described above. In this case, for example, it is conceivable to actually measure the time required to remove the support layer 52 using a test shaped object 50 and the support layer 52, and predict the support layer removal time using the result of the actual measurement. More specifically, in this case, for example, it is conceivable to perform the measurement using the shaped object 50 and the support layer 52 before the prediction of the support layer removal time (before starting the operation of the estimation process), and set a coefficient to use for predicting the support layer removal time based on an actual measurement value. With such a configuration, for example, the support layer removal time can be appropriately predicted. In this case, the measurement using the test shaped object 50 and the support layer 52 is preferably performed in the same environment as the environment in which the support layer 52 that is a target for the prediction of the support layer removal time is removed. With such a configuration, for example, the influence of the conditions and the like that depend on the environment can be suppressed appropriately. Thus, for example, the prediction of the support layer removal time can be performed with higher accuracy.

In addition, for the use of the result of measurement using the test shaped object 50 and the support layer 52, for example, it can be considered as an example of an operation of predicting the support layer removal time with reference to the result of the removal of the support layer 52 performed in the past. In this regard, the result of the removal of the support layer 52 performed in the past is not limited to the result of the removal of the support layer 52 performed before the operation of the estimation process is started, and the actual time taken for removing the support layer 52 performed after the start of the operation may be further referenced. In this case, for example, adjustment of a coefficient used for prediction of the support layer removal time may be performed based on the difference between the support layer removal time predicted in advance and the time actually required for the removal of the support layer 52. With this configuration, for example, the accuracy of prediction can be improved by accumulating past results relating to the time required for removing the support layer 52.

More specifically, in this case, the control PC 14 predicts the support layer removal time based further on, for example, actual removal data which is data associating the time required to actually remove the support layer 52 in the past and the layout indicating the support layer 52. With this configuration, for example, the support layer removal time can be predicted with higher accuracy based on past results. Furthermore, in this case, associating the time required to remove the support layer 52 and the layout may be, for example, associating the time required to remove the support layer 52 with a part of the layout. Moreover, the association with the layout may be performed, for example, by preparing a plurality of patterns for classifying the layout in advance and performing association with any one of the patterns.

In this case, the control PC 14 manages the actual removal data so that new actual removal data is sequentially accumulated. For example, the support layer removal time is predicted based on the accumulated actual removal data. With this configuration, for example, the support layer removal time can be appropriately predicted with higher accuracy. In this case, for example, it is conceivable to predict the support layer removal time using the artificial intelligence (AI) technology or the like by executing machine learning using data in which the actual removal data and the pattern are associated with each other.

Furthermore, in the operation of predicting the support layer removal time, the control PC 14 may cause a device external to the control PC 14 to execute some of the necessary processes. In this case, the control PC 14 predicts the support layer removal time by using the result received from the external process. More specifically, for example, when using artificial intelligence technology as described above, some processes are performed by a computer or the like which is external to the shaping system 10 (see FIGS. 1A to 1C), and the support layer removal time may be predicted by the control PC 14 based on the result of such processes. With this configuration, for example, the support layer removal time can be predicted with higher accuracy while preventing the cost of the device configuring the shaping system 10 from greatly increasing. In addition, for example, some processes in the operation of predicting the support layer removal time may be performed by the controller 110 (see FIGS. 1A to 1C) or the like in the shaping device 12. For example, when the controller 110 has a GPU function, it may be considered to have the controller 110 perform at least one of the processes related to image processing or artificial intelligence technology. With this configuration, for example, the resources in the shaping system 10 can be effectively used to appropriately predict the support layer removal time.

INDUSTRIAL APPLICABILITY

The present disclosure can be suitably used, for example, in a shaping system.

What is claimed is:

1. A shaping system for shaping a shaped object that is stereoscopic, the shaping system comprising:
    a shaping portion that is a three-dimensional shaping device which performs an operation of shaping the shaped object; and
    a shaping controller that controls the operation of shaping the shaped object in the shaping portion,
    wherein
    at a time of shaping the shaped object, the shaping portion is configured to further form a support layer that supports at least a part of the shaped object being shaped, and
    the shaping controller is configured to predict a support layer removal time which is a time required for removing the support layer after formation of the shaped object and the support layer in the shaping portion is completed;
    the shaping controller is configured to predict the support layer removal time based on a surface area of the support layer;
    the shaping portion is configured to use a material having a property of dissolving with respect to a support material removing liquid which is a predetermined liquid as a support material to become a material of the support layer,
    the support layer removal time is a time required for removing the support layer when removing the support layer by immersing the shaped object and the support layer in the support material removing liquid, and
    the shaping controller is configured to predict a surface area during dissolution which is a surface area of the support layer remaining at a time point a part of the support layer is dissolved by being immersed in the support material removing liquid, and to predict the support layer removal time based further on the surface area during dissolution;
    wherein the shaping controller is configured to:
        select a layout that minimizes the support layer removal time or a total time of a shaping time and the support layer removal time from various layouts each comprising a corresponding support layer,
        adjust a position of an inkjet head of the three-dimensional shaping device that ejects a material for shaping the shaped object with respect to a layering direction of the selected layout of the shaped object to be 3D printed, and
        control the three-dimensional shaping device to print the shaped object in the layering direction.

2. The shaping system according to claim 1, wherein the shaping controller is configured to specify the layout which is an information indicating an orientation of the shaped object being shaped and a position where the support layer that supports at least a part of the shaped object being shaped is formed, so as to specify an operation for shaping the shaped object and predict the support layer removal time in association with the layout.

3. The shaping system according to claim 1, wherein the shaping portion is configured to use a material having a property of dissolving with respect to a support material removing liquid which is a predetermined liquid as a support material to become a material of the support layer,
    the support layer removal time is a time required for removing the support layer when removing the support layer by immersing the shaped object and the support layer in the support material removing liquid, and
    when using the support material removing liquid having a history of being used to remove the support layer formed at a time of shaping another shaped object, the shaping controller is configured to predict the support layer removal time based further on an amount of the support material dissolved in the support material removing liquid.

4. The shaping system according to claim 1, wherein the shaping controller is configured to predict the support layer removal time based on actual removal data which is data associating a time required when the support layer was actually removed in a past and the layout indicating the support layer.

5. The shaping system according to claim 4, wherein the shaping controller is configured to manage the actual removal data to sequentially accumulate new actual removal data, and predict the support layer removal time based on the accumulated actual removal data.

6. The shaping system according to claim 1, wherein the shaping controller is configured to display a result of prediction of the support layer removal time.

7. The shaping system according to claim 1, wherein the shaping controller is configured to specify the layout which is an information indicating an orientation of the shaped object being shaped and a position where the support layer that supports at least a part of the shaped object being shaped is formed, so as to specify an operation for shaping the shaped object, search for the layout in which the support layer removal time is shorter, and display a result of the search.

8. The shaping system according to claim 1, wherein the shaping controller is configured to specify the layout which is an information indicating an orientation of the shaped object being shaped and a position where the support layer that supports at least a part of the shaped object being shaped is formed, so as to specify an operation for shaping the shaped object, search for the layout in which a total time of a shaping time which is a time required to form the shaped object and the support layer in the shaping portion and the support layer removal time is shorter, and display a result of the search.

9. A shaping method for shaping a shaped object that is stereoscopic using the shaping system according to claim 1, the shaping method comprising:
    using the shaping controller for:
        controlling the operation of performing an operation of shaping the shaped object in the shaping portion;
        having the shaping portion further form the support layer that supports at least a part of the shaped object being shaped at a time of shaping the shaped object; and
        predicting the support layer removal time which is a time required for removing the support layer after formation of the shaped object and the support layer in the shaping portion is completed.

10. A shaping control apparatus that controls an operation of a shaping portion that is a three-dimensional shaping device which performs an operation of shaping a shaped object, wherein at a time of shaping the shaped object, the shaping portion is configured to further form a support layer that supports at least a part of the shaped object being shaped, and the shaping control apparatus is configured to predict a support layer removal time which is a time required for removing the support layer after formation of the shaped object and the support layer in the shaping portion is completed;

the shaping control apparatus is configured to predict the support layer removal time based on a surface area of the support layer;

the shaping portion is configured to use a material having a property of dissolving with respect to a support material removing liquid which is a predetermined liquid as a support material to become a material of the support layer, the support layer removal time is a time required for removing the support layer when removing the support layer by immersing the shaped object and the support layer in the support material removing liquid, and the shaping control apparatus is configured to predict a surface area during dissolution which is a surface area of the support layer remaining at a time point a part of the support layer is dissolved by being immersed in the support material removing liquid, and to predict the support layer removal time based further on the surface area during dissolution;

wherein the shaping controller is configured to:

select a layout that minimizes the support layer removal time or a total time of a shaping time and the support layer removal time from various layouts each comprising a corresponding support layer, adjust a position of an inkjet head of the three-dimensional shaping device that ejects a material for shaping the shaped object with respect to a layering direction of the selected layout of the shaped object to be 3D printed, and control the three-dimensional shaping device to print the shaped object in the layering direction.

* * * * *